United States Patent [19]

Lansing

[11] Patent Number: 4,984,840
[45] Date of Patent: Jan. 15, 1991

[54] ONE-PIECE SUNVISOR EXTENDER

[76] Inventor: Ronald C. Lansing, 30315 N. Oak Grove Ave., Libertyville, Ill. 60048

[21] Appl. No.: 500,565

[22] Filed: Mar. 28, 1990

[51] Int. Cl.$^5$ .............................................. B60J 3/02
[52] U.S. Cl. .................................... 296/97.6; 296/97.8
[58] Field of Search ...................... 296/97.6, 97.7, 97.8

[56] References Cited

U.S. PATENT DOCUMENTS

| | | | |
|---|---|---|---|
| 2,185,898 | 1/1940 | Mitch et al. | 296/97.6 |
| 3,195,946 | 7/1965 | Van Sickle | 296/97.6 |
| 3,351,375 | 11/1967 | Wheeler | 296/97.6 |
| 3,515,427 | 6/1970 | Van Sickle | 296/97.6 |
| 4,635,995 | 1/1987 | Mineck | 296/97.6 |

*Primary Examiner*—Robert R. Song

[57] ABSTRACT

The one-piece sunvisor extender improves on existing devices by providing a product that allows for more coverage, is of unique but simple design, uses a material that has low mass and is flexible to allow for a safer product. Its unique design provides for a self clamping action and by using cellular material to form the device allows it to be released by simple hand motion. In addition the device provides for an additional range of movement (right or left) not found on other models, can be trimmed to match the angle of the windshield post, can conform to other interior components it comes in contact with, and will reduce damage to other interior components. The one piece design requires no assembly, thus reducing its cost.

1 Claim, 1 Drawing Sheet

ONE-PIECE SUNVISOR EXTENDER

This invention relates to sunvisor extenders which are particularly useful for attaching to sunvisors to provide additional shade beyond what the sunvisor itself can provide.

BACKGROUND OF THE INVENTION

It is the custom for people to use sunvisor extenders if they require additional shade beyond what the sunvisor provides. The sunvisor extender normally clamps to the sunvisor and then swings down on a hindge to allow extended coverage in the up/down position. The typical sunvisor extender is made of several parts and the assembly of those parts adds to its cost. The materials used are normally hard plastic and/or metal which may pose a hazard in the event of a accident. Accordingly, it is an important object of the present invention to produce sunvisor extenders of reduced cost. Another object of the invention is to improve its range of coverage by providing for a second range of motion, using a material that can conform to the interior of the vehicle and can be trimmed to fit. Another object of the invention is to provide a product that will reduce the damage it causes when it comes in contact with other interior components. Another object of the invention is to provide a safer product by using a material that does not pose a hazard in the event of an accident. Further objects and advantages will be apparent from the following description and the accompanying drawings.

SUMMARY OF THE INVENTION

In carrying out the invention there is provided a one-piece sunvisor extender for attachment to a sunvisor, of the type having a slit to allow placement over the sunvisor, comprising a one piece structure molded or cut from cellular material, that is designed to provide a self clamping action, that is open on both the right and left sides to allow additional coverage from side to side as well as up and down. The use of cellular material provides for a safe product as well as a more stable extender due to the low mass of the invention (sunvisor will not move as much during periods of externally caused vibration). In addition, the cellular material can conform to the various angles of windshield posts, can be trimmed for an even better fit if necessary, and will reduce the damage to other interior components it comes in contact with, and has properties which allow for increased friction between the invention and cloth sunvisors. Also, this one piece structure replaces an assembly of parts.

DESCRIPTION OF PREFERRED EMBODIMENT

Figure 1:
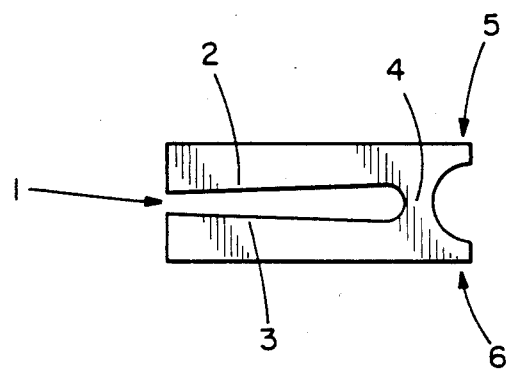
FIG. 1 is a side view of the one-piece sunvisor extender. It is preferably molded or cut of a cellular material.

FIG. 1 is a side view of the one-piece sunvisor extender. It is preferably molded of a cellular material such as foam rubber and has an opening 1 which allows it to be placed over the sunvisor. The opening 1 is open on both the right and left sides to allow it to be positioned over the full length of the sunvisor and can extend beyond the right or left side of the sunvisor to allow for additional coverage (between the ends of the sunvisor and the windshield posts or windshield mounted mirror). Surfaces 2 and 3, which contact the sunvisor are formed at an angle to provide a more even contact between the sunvisor and the one-piece sunvisor extender even when the extender is pulled back (in the down position). Area 4 is concave on both sides to allow the one-piece sunvisor extender to be opened at opening 1 when areas 5 and 6 are pressed toward each other by simple hand movement. This will allow for easier placement of the one-piece sunvisor extender over the sunvisor and its movement to different positions on the sunvisor.

Figure 2:
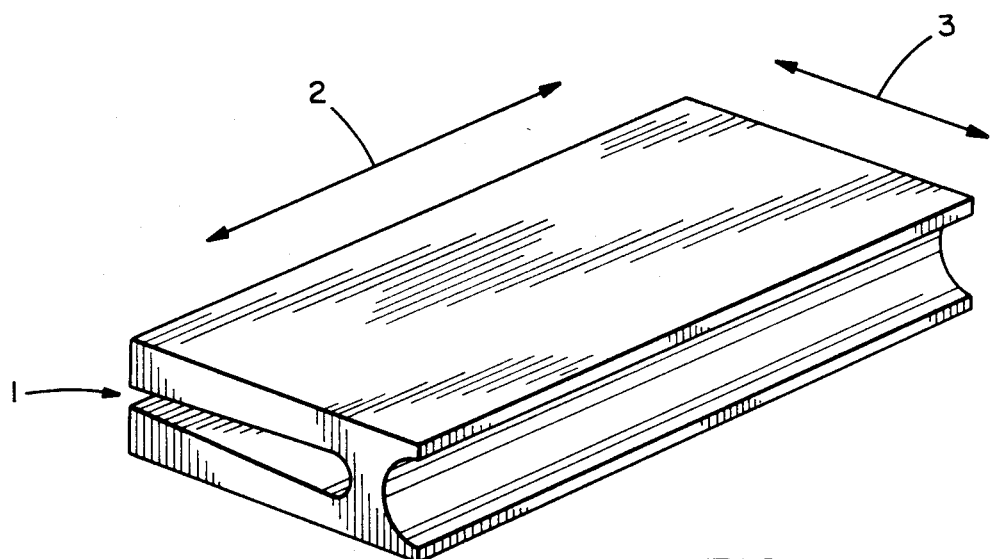
FIG. 2 is a perspective view of the one-piece sunvisor extender.

FIG. 2 is a perspective view of the one-piece sunvisor extender. The structure has an opening 1 to allow it to be positioned over the sunvisor either to the right or left indicated by the arrows 2, or either in the up or down position as indicated by the arrows 3. The size of the invention may vary depending upon the amount of additional coverage needed and the size of the sunvisor itself.

It will be apparent from the above description that the invention, particularly in FIGS. 1 and 2, achieves all of the objects set forth at the beginning of the specification, including reducing the cost of sunvisor extenders, providing sunvisor extenders that are of improved quality by allowing a greater range of coverage, providing a safer product by the use of cellular material, and providing a product with reduced mass to allow it to stay in position. It also has been found, that by using cellular material in conjunction with this design, that the friction between the sunvisor and the invention holds it in place without the use of several parts. Also, the flexable material provides a product which conforms to the shape of the windshield posts and windshield mounted mirror, can be trimmed along the right or left sides to form a better fit when moved agianst the windshield post, and will reduce the damage to other interior components it comes in contact with.

While this invention has been shown and described in connection with a particular preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

I claim:

1. A one-piece sunvisor extender for sliding over the exposed edges of a conventional sunvisor consisting of:
   (a) a flat panel of flexible cellular material, substantially rectangular in shape,
   (b) with an open ended internally angled slit running the full length into which the lower edge of the conventional sunvisor is inserted,
   (c) and whose side opposite the slit is substantially concave,
   (d) whereby, when the concave edge is compressed, the one piece sunvisor extender may be moved about the sunvisor or removed completely.

* * * * *